HENDRICK & CHATTAWAY.
Gun-Swab.

No. 56,559.  Patented July 24, 1866.

Witnesses.
J. E. Fuller
J. Brown

Inventors.
P. M. Hendrick
John J. Chattaway
by their attorney
J. B. Gardner

UNITED STATES PATENT OFFICE.

P. M. HENDRICK AND JOHN J. CHATTAWAY, OF SPRINGFIELD, MASS.

IMPROVEMENT IN GUN-SWABS.

Specification forming part of Letters Patent No. 56,559, dated July 24, 1866.

*To all whom it may concern:*

Be it known that we, P. M. HENDRICK and JOHN J. CHATTAWAY, both of Springfield, Hampden county, Commonwealth of Massachusetts, have invented a new and Improved Gun-Swab; and we do hereby declare that the following is a full and exact description thereof, reference being had to the accompanying drawings, and to letters of reference marked thereon.

This invention consists of a device for removing from the bores of fire-arms the smut and impurities consequent on a frequent discharge, which render the barrels foul and injure the bores if allowed to remain.

We will first describe the construction of this invention, referring to the accompanying drawings, of which—

Figure 1:
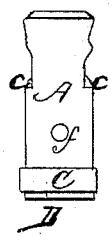
Figure 2:
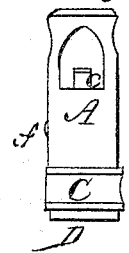
Figure 3:
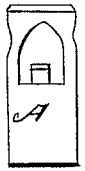
Figure 4:
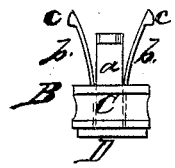

Figure 1 is a side view, showing the parts in one position. Fig. 2 shows them in another. Fig. 3 is detail view of the part A. Fig. 4 is a detail view of the part B.

The principal feature of this invention is the use of the elastic swab C and forcing the same to expand after the device is placed in the bottom of the barrel attached to the screwed end of the rammer.

The piece B is formed of the part *a*, to which, at each side, are attached the springs *b b*, having the projections *c c*. Attached to the spindle *d*, below the springs around the spindle, I place the cylinder, of rubber or similar elastic material, C, kept in place by the head D. The spindle *d* enters the part A, and is fastened there by the small screw *f*, which enters a slot in the spindle. The springs also enter slots formed in the interior of the part A.

The operation is as follows: The device being attached to the end of the rammer is dropped into the barrel, and by a pressure on the top the part A is forced down on the swab C until the projections *c c* catch into notches formed to receive them in the sides of the part A. This operation expands the rubber in the direction of its diameter. The rammer is now drawn out, and, fitting the bore tightly, takes out with it all impurities contained in it.

I form the rubber in the peculiar manner shown in the drawings—namely, of less diameter in the center longitudinally and of greater diameter at the top and bottom, so that when expanded it may be of nearly the same diameter throughout.

The utility of this invention is readily seen, as the smut is not forced down into the bottom of the barrel, as with ordinary guns, but the rubber is not expanded until it is at the bottom of the barrel, and thus the smut is removed without forcing it down into the bottom of the barrel. And in artillery it may be used without "thumbing the piece," as all the smut is before the swab as it comes out, and consequently none is left in the barrel to hold fire; and also the object of thumbing is accomplished—that is, forming a vacuum in the barrel, as the swab fits so closely as to form nearly a complete vacuum without closing the touch-hole.

This device may be adapted to different sizes of bores by placing small washers under the cylinder of rubber, so as to make it expand to a greater diameter, and to different sizes of rammers by attaching it thereto by means of a small cap having an external screw cut on it, which enters the top of the part A, and an internal screw cut in a hole, into which the end of the rammer is inserted; and, also, it may, if desired, be used with a patch, as the vacuum caused by drawing out the rammer causes a patch to follow it when withdrawn.

Now, having described our invention, what we claim as new, and desire to secure by Letters Patent, is—

1. The use of a swab of rubber or similar elastic material, when the same is expanded laterally by vertical compression within the barrel, for the purpose of cleaning the same, substantially as herein set forth.

2. The combination of the springs *b b* with the other parts of the device, for the purpose of holding the swab in place when compressed and expanded, substantially as herein described.

P. M. HENDRICK.
JOHN J. CHATTAWAY.

Witnesses:
J. W. GARDINER,
C. S. WELLS.